(12) United States Patent
Navot et al.

(10) Patent No.: US 9,994,316 B1
(45) Date of Patent: *Jun. 12, 2018

(54) UNMANNED AERIAL VEHICLE SENSOR SYNCHRONIZATION

(71) Applicant: Amazon Technologies, Inc., Seattle, WA (US)

(72) Inventors: Amir Navot, Seattle, WA (US); Scott Raymond Harris, Bainbridge Island, WA (US); Daniel Buchmueller, Seattle, WA (US)

(73) Assignee: Athorus, PLLC, Seattle, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/381,601

(22) Filed: Dec. 16, 2016

Related U.S. Application Data

(63) Continuation of application No. 14/751,032, filed on Jun. 25, 2015, now Pat. No. 9,555,883.

(51) Int. Cl.
| | | |
|---|---|---|
| *B64C 39/02* | (2006.01) |
| *B64D 45/00* | (2006.01) |
| *G05D 1/00* | (2006.01) |
| *G05D 1/08* | (2006.01) |
| *G05D 1/02* | (2006.01) |
| *H04L 29/08* | (2006.01) |

(52) U.S. Cl.
CPC ............ *B64C 39/024* (2013.01); *B64D 45/00* (2013.01); *G05D 1/0088* (2013.01); *G05D 1/0202* (2013.01); *G05D 1/0808* (2013.01); *B64C 2201/024* (2013.01); *B64C 2201/145* (2013.01); *B64D 2045/0085* (2013.01); *H04L 67/12* (2013.01)

(58) Field of Classification Search
CPC ............ B64C 39/024; B64C 2201/145; B64C 2201/024; G05D 1/0808; G05D 1/0088; B64D 45/00; B64D 2045/0085; H04L 67/12
USPC ............................................................ 701/3
See application file for complete search history.

(56) References Cited

U.S. PATENT DOCUMENTS

| | | | |
|---|---|---|---|
| 6,577,872 B1 | 6/2003 | Lundh et al. |
| 8,421,864 B2 | 4/2013 | Tano |
| 8,654,758 B2 | 2/2014 | Zakrzewski et al. |
| 8,780,195 B1 | 7/2014 | Rubin |
| 2005/0041692 A1 | 2/2005 | Kallstenius |
| 2010/0238917 A1 | 9/2010 | Silverman et al. |
| 2010/0253594 A1 | 10/2010 | Szczerba et al. |
| 2012/0224827 A1 | 9/2012 | Tano |
| 2012/0263165 A1 | 10/2012 | Zakrzewski et al. |
| 2013/0212420 A1* | 8/2013 | Lawson ............. G05B 19/4185 713/400 |

(Continued)

*Primary Examiner* — Tyler J Lee
(74) *Attorney, Agent, or Firm* — Athorus, PLLC

(57) ABSTRACT

Described are methods and apparatuses for synchronizing two or more sensors of an UAV. In the implementations described, a synchronization event is performed such that identifiable signals of the synchronization event can be collected by each sensor of the UAV. The synchronization event may be generated by a synchronization event component that generates multiple output signals (e.g., audio, visual, and physical) at approximately the same time so that different sensors can each collect and store at least one of the output signals. The collected signals are then compared and the sensors are adjusted to align the signals.

20 Claims, 5 Drawing Sheets

(56) References Cited

U.S. PATENT DOCUMENTS

2015/0248131 A1 9/2015 Fairfield et al.

* cited by examiner

UNMANNED AERIAL VEHICLE SENSOR SYNCHRONIZATION

CLAIM OF PRIORITY

This application is a continuation of and claims the benefit of U.S. application Ser. No. 14/751,032, filed Jun. 25, 2015, entitled "Unmanned Aerial Vehicle Sensor Synchronization," which is incorporated by reference herein in its entirety.

BACKGROUND

Unmanned aerial vehicles ("UAV") are continuing to increase in use. For example, UAVs are often used for surveillance. UAVs often include multiple devices or sensors that collect data while the UAV is in-flight. For example, a UAV may include a camera, a global positioning system ("GPS") receiver, an accelerometer, an inclinometer, etc. As the UAV aerially navigates, these devices or sensors collect and store data that includes a timestamp, indicating the time at which the data was collected.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
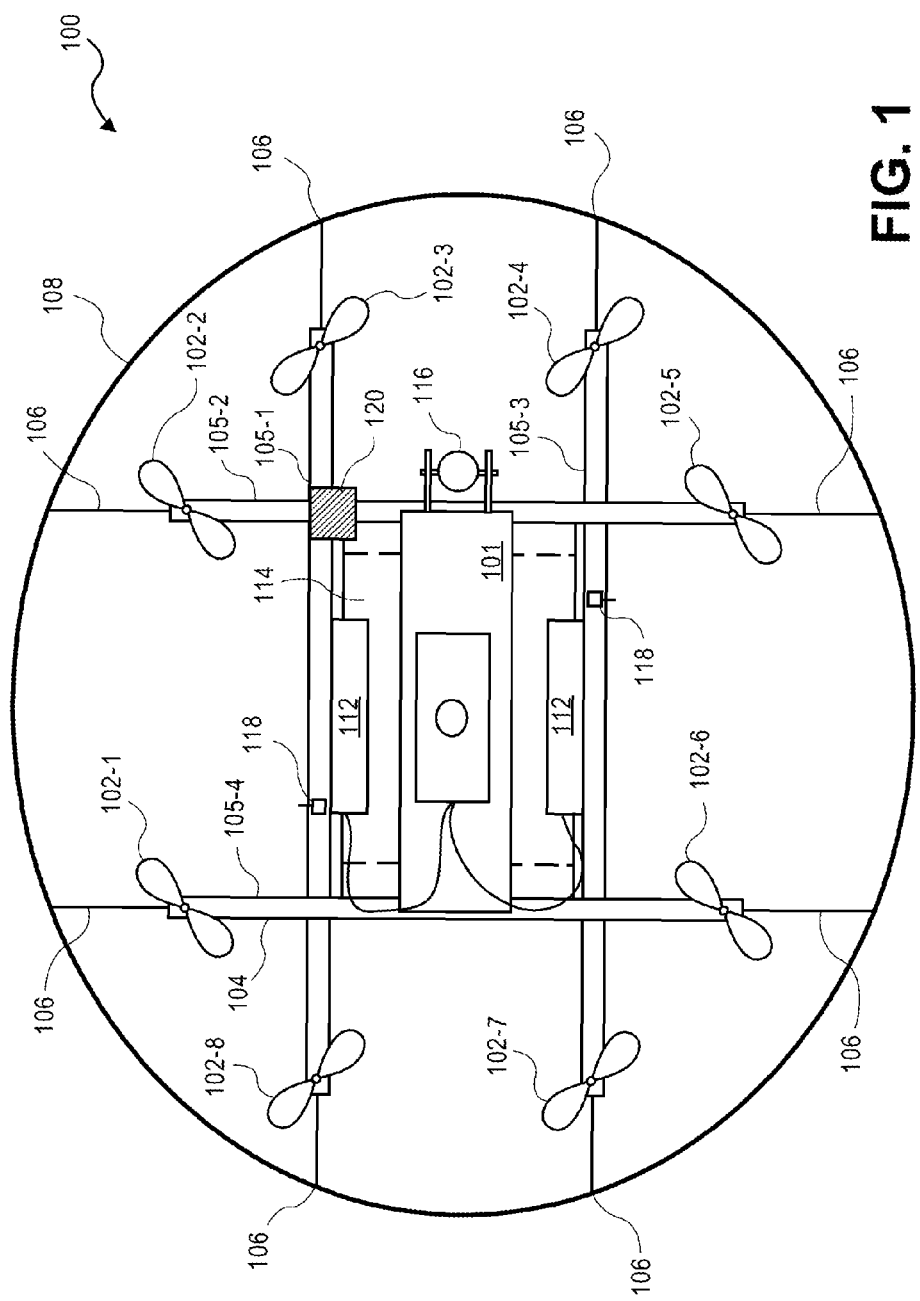
FIG. 1 depicts a block diagram of a top-down view of an unmanned aerial vehicle, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Described are methods and apparatuses for synchronizing sensors of an unmanned aerial vehicle ("UAV") in real time. In the implementations described, a synchronization event is performed such that identifiable signals of the synchronization event can be collected by sensors of the UAV and synchronized in real time during ground or flight operations. The synchronization event may be generated by a synchronization event component that generates multiple output signals (e.g., audio, visual, electromagnetic, and physical) at approximately the same time so that different sensors can each collect and store at least one of the output signals. In another implementation, the UAV may perform the synchronization event by executing a particular aerial maneuver while the UAV is in-flight. For example, the UAV may temporarily shut off the propellers of the UAV for a defined period of time, perform a defined maneuver, etc., so that the different sensors of the UAV each receive, synchronize, and store identifiable signals representative of the synchronization event. Having the ability to synchronize sensors in real-time allows UAV operators to ensure (e.g., to re-confirm following a disruption) that the aforementioned sensors are providing time-synchronized information to the flight controller. For example, in a UAV having onboard sonar and LIDAR sensors, non-synchronized data from the visual (LIDAR) and audio (sonar) sensors may confuse or otherwise misinform a sense-and-avoid controller and hinder the UAV's ability to identify and avoid objects.

The identifiable signals collected by each sensor of the UAV are detected by a corresponding event detection component and used to synchronize the multiple sensors of the UAV. In some implementations, the sensors may be instructed or configured to adjust their internal clocks based on the identified signal such that timestamps from each clock are synchronized as the data is collected by the various sensors. In another implementation, each event detection component that is coupled to a sensor may process the sensor data that includes identifiable signals from the synchronization event, determine an event time as recorded by the sensor (e.g., the timestamp included in the sensor data) and provide the event time to the synchronization event controller. The synchronization event controller may determine an offset or timestamp adjustment for one or more of the sensors and/or sensor data, and adjust the timestamp(s) as the data is collected and stored so that the timestamps for each sensor data are synchronized. Alternatively, the clocks may be adjusted so the timestamps for each sensor are synchronized.

By synchronizing the sensors of a UAV, health monitoring of the UAV may be improved and utilized while the UAV is in flight and/or as part of a pre-departure flight confirmation process. For example, the UAV control system may utilize the sensor data from multiple sensors to determine if components of the UAV are operating properly. By having the sensor data synchronized, data from multiple sensors may be utilized. For example, the UAV control system may consider audio recorded by a microphone sensor, position recorded by an accelerometer, and rotation speed recorded from an electronic speed control ("ESC") sensor to collectively determine if the propeller motors of the UAV are all functioning properly.

Sensor synchronization may be performed at various instances during operation of the UAV and the sensors synchronized during operation of the UAV. The periodic synchronization of the sensors improves the safety of the UAVs because various UAV components (e.g., flight controller) can utilize sensor data from multiple sensors and that data is aligned. For example, the flight controller may utilize sensor data from multiple sensors to make autonomous navigation decisions. By synchronizing the sensor data from multiple sensors while the UAV is in operation, the flight controller is making decisions based on aligned data.

Likewise, by synchronizing the data from multiple sensors based on a synchronization event, post flight processing of the data is simplified and analysis of the data is improved because the data collected and stored by each sensor of the UAV is synchronized.

A device or sensor, collectively referred to herein as a sensor, is any component of a UAV that collects and stores, or provides for storage, data that includes a timestamp. For example, sensors include, but are not limited to, a camera, a GPS receiver, an accelerometer, an inclinometer, a barometer, a microphone, a gyroscope, a distance determining element (e.g., time of flight sensor), an inertial measurement unit ("IMU"), a magnetometer, an ESC sensor, a light sensor, and the like. When a UAV is powered and/or in-flight, sensors collect data and store that data in a memory of the UAV and/or provide that data to a remote resource and/or another component. The collected data includes a timestamp representative of a time when the data was collected.

While some sensors may utilize a master or common clock, such as a GPS clock, other sensors may be independent and not receive time related information from the master or common clock. For example, the IMU, accelerometer, and magnetometer may all utilize time from a clock of the GPS, but a camera or microphone mounted on the UAV may be independent of the GPS. Because some sensors may utilize different clocks, the timestamps corresponding to the data collected by the different sensors may not be synchronized.

Likewise, even though some sensors may utilize the same clock, the association of the data with a timestamp indicated by the clock may be performed differently for different sensors. For example, a gyroscope may utilize time from the GPS clock for including timestamps on collected gyroscope data and the magnetometer may likewise utilize time from the GPS clock for including timestamps on collected magnetometer data. However, the gyroscope may utilize a timestamp that is obtained when data collection is initialized. For example, if the gyroscope collects two minutes of data at five samples per second, the gyroscope may associate a timestamp with each data sample such that the timestamp is representative of the start of each sample. In comparison, the magnetometer may collect two minutes of data at five samples per second but the magnetometer may associate a timestamp with each data sample such that the timestamp is representative of the end of each sample. In such instances, even though the same clock is being used, because the timestamps for data samples are generated at different portions of the data samples, the data between the two sensors will not be synchronized.

FIG. 1 illustrates a block diagram of a top-down view of a UAV 100, according to an implementation. As illustrated, the UAV 100 includes eight propellers 102-1, 102-2, 102-3, 102-4, 102-5, 102-6, 102-7, 102-8 spaced about the frame 104 of the UAV. The propellers 102 may be any form of propeller (e.g., graphite, carbon fiber) and of a size sufficient to lift the UAV 100 and any inventory engaged by the UAV 100 so that the UAV 100 can navigate through the air to deliver the item(s) to a delivery destination. While this example includes eight propellers, in other implementations, more or fewer propellers may be utilized. Likewise, in some implementations, the propellers may be positioned at different locations on the UAV 100. In addition, alternative methods of propulsion may be utilized as "motors" in implementations described herein. For example, fans, jets, turbojets, turbo fans, jet engines, internal combustion engines, and the like may be used (either with propellers or other devices) to propel the UAV.

The frame 104 of the UAV 100 may likewise be of any suitable material, such as graphite, carbon fiber, and/or aluminum. In this example, the frame 104 of the UAV 100 includes four rigid members 105-1, 105-2, 105-3, 105-4, or beams arranged in a hash pattern with the rigid members intersecting and joined at approximately perpendicular angles. In this example, rigid members 105-1 and 105-3 are arranged substantially parallel to one another and are approximately the same length. Rigid members 105-2 and 105-4 are arranged substantially parallel to one another, yet perpendicular to rigid members 105-1 and 105-3. Rigid members 105-2 and 105-4 are approximately the same length. In some embodiments, all of the rigid members 105 may be of approximately the same length, while, in other implementations, some or all of the rigid members may be of different lengths. Likewise, the spacing and/or orientation between the two sets of rigid members may be approximately the same or different.

While the implementation illustrated in FIG. 1 includes four rigid members 105 that are joined to form the frame 104, in other implementations, there may be fewer or more components to the frame 104. For example, rather than four rigid members, in other implementations, the frame 104 of the UAV 100 may be configured to include six rigid members. In such an example, two of the rigid members 105-2, 105-4 may be positioned parallel to one another. Rigid members 105-1, 105-3 and two additional rigid members on either side of rigid members 105-1, 105-3 may all be positioned parallel to one another and perpendicular to rigid members 105-2, 105-4. With additional rigid members, additional cavities with rigid members on all four sides may be formed by the frame 104. A cavity within the frame 104 may be configured to include an inventory engagement mechanism for the engagement, transport, and delivery of item(s) and/or containers that contain item(s).

In some implementations, the UAV may be configured to reduce aerodynamic resistance. For example, an aerodynamic housing may be included on the UAV that encloses the UAV control system 101, one or more of the rigid members 105, the frame 104, and/or other components of the UAV 100. The housing may be made of any suitable material(s) such as graphite, carbon fiber, aluminum, titanium, magnesium, fiberglass, etc. Likewise, in some implementations, the location and/or the shape of the inventory (e.g., item or container) may be aerodynamically designed. For example, in some implementations, the inventory engagement mechanism may be configured such that when the inventory is engaged it is enclosed within the frame and/or housing of the UAV 100 so that no additional drag is created during transport of the inventory by the UAV 100. In other implementations, the inventory may be shaped to reduce drag and provide a more aerodynamic design of the UAV and the inventory. For example, if the inventory is a container and a portion of the container extends below the UAV when engaged, the exposed portion of the container may have a curved shape.

The propellers 102 and corresponding propeller motors are positioned at both ends of each rigid member 105. The propeller motors may be any form of motor capable of generating enough speed with the propellers to lift the UAV 100 and any engaged inventory thereby enabling aerial transport of the inventory.

Extending outward from each rigid member is a support arm 106 that is connected to a safety barrier 108. In this example, the safety barrier is positioned around and attached to the UAV 100 in such a manner that the motors and propellers 102 are within the perimeter of the safety barrier 108. The safety barrier may be plastic, rubber, etc. Likewise, depending on the length of the support arms 106 and/or the length, number or positioning of the rigid members 105, the safety barrier may be round, oval, or any other shape.

Mounted to the frame 104 is the UAV control system 101. In this example, the UAV control system 101 is mounted in the middle and on top of the frame 104. The UAV control system 101, as discussed in further detail below with respect to FIG. 5, controls the operation, routing, navigation, communication and the inventory engagement mechanism of the UAV 100.

Likewise, the UAV 100 includes one or more power modules 112. In this example, the UAV 100 includes two power modules 112 that are removably mounted to the frame 104. The power module(s) for the UAV may be in the form of battery power, solar power, gas power, super capacitor, fuel cell, alternative power generation source, or a combination thereof. For example, the power modules 112 may each be an 8000 mAh Lithium Polymer (LiPo) battery. The power modules 112 are coupled to and provide power for the UAV control system 101 and the propeller motors.

In some implementations, one or more of the power modules may be configured such that it can be autonomously removed and/or replaced with another power module while the UAV is landed. For example, when the UAV lands at a materials handling facility, the UAV may engage with a charging member at the location that will recharge the power module. In some implementations, a container may include a power module and, when the engagement mechanism of the UAV engages with the container, the power module of the container may provide power to the UAV. For example, when an item is being delivered to a delivery location, the power module included in the container may be utilized to power the UAV, rather than and/or in addition to the power modules 112 of the UAV 100. When the container is disengaged, the power provided by the container is removed and the UAV 100 operates using power from the UAV power module 112.

As mentioned above, the UAV 100 may also include an inventory engagement mechanism 114. The inventory engagement mechanism may be configured to engage and disengage items and/or containers that hold items. In this example, the inventory engagement mechanism 114 is positioned within a cavity of the frame 104 that is formed by the intersections of the rigid members 105. In this example, the inventory engagement mechanism is positioned beneath the UAV control system 101. In implementations with additional rigid members, the UAV may include additional inventory engagement mechanisms and/or the inventory engagement mechanism 114 may be positioned in a different cavity within the frame 104. The inventory engagement mechanism may be of any size sufficient to securely engage and disengage containers that contain inventory. In other implementations, the engagement mechanism may operate as the container, containing the inventory item(s) to be delivered.

In some implementations, the inventory engagement mechanism 114 may include a retractable cable, pulley, or other member that may be extended or lowered from the UAV to place an item or a container containing an item at an inventory location. The inventory engagement mechanism communicates with (via wired or wireless communication) and is controlled by the UAV control system 101.

The UAV 100 may also include one or more sensors. For example, the UAV may include one or more cameras 116 (a sensor) that may be positioned to view and/or obtain images of delivery destinations, delivery locations, etc. For example, the camera 116 may be mounted on a gimbal that can be used to provide two-axis rotation of the camera with respect to the UAV. The camera may be any type of camera, such as a red, green, blue color sending camera, a still camera, a video camera, a stereo imagery camera, etc.

Likewise, the UAV may include one or more microphones 118 that may be powered by the power modules 112. Other sensors that may be included on the UAV 100 include a GPS receiver, an accelerometer, an inclinometer, a barometer, a microphone, a gyroscope, an IMU, a magnetometer, a distance determining element, an ESC sensor, a light sensor, and the like.

The UAV may also include an event synchronization component 120. The event synchronization component is configured to generate multiple identifiable output signals at approximately the same time such that the output signals can be collected by the different sensors of the UAV 100. For example, the event synchronization component 120 may be configured to generate a visual output, such as a visible light or visible light pattern, an audio output, such as an auditory tone or tones, and/or create a physical output, such as a contact or impact with the UAV.

In one implementation, the event synchronization component 120 may include a solenoid and/or actuator that may be activated to cause one or more impacts between the event synchronization component and a portion of the UAV 100, such as the frame. The output signal generated by the physical contact with the UAV may be detected and collected by motion-based sensors (e.g., IMU, accelerometer, and gyroscope) and the audio output generated from the impact may be detected and collected by the microphone. Likewise, in some implementations, the event synchronization component, in addition to causing a physical contact between the event synchronization component and the UAV, may generate a visual output (e.g., light or light pattern) that is detected by vision-based sensors (e.g., cameras).

As discussed further below, as part of a sensor synchronization, the event synchronization component 120 generates one or more identifiable signals that are collected by various sensors of the UAV 100. Each of the sensors may likewise have an event detection component that that is configured to detect the event based on the signal generated by the respective sensor. For example, a motion-based sensor may have a corresponding event detection component that is configured to detect an occurrence of an event in the motion signal generated by the motion sensor. In some implementations, different types or categories of sensors may utilize the same event detection component. For example, motion based sensors may utilize a motion event detection component, audio sensors may utilize an audio event detection component, etc. Each event detection component determines an event time indicating when the event occurred, as determined by the sensor. The event times are then compared by a sensor synchronization controller of the UAV and adjusted so that a timestamp for each identifiable event signal corresponds and the event signals are aligned.

While the implementations of the UAV discussed herein utilize propellers to achieve and maintain flight, in other implementations, the UAV may be configured in other manners. For example, the UAV may include fixed wings and/or a combination of both propellers and fixed wings. For example, the UAV may utilize one or more propellers to enable takeoff and landing and a fixed wing configuration or a combination wing and propeller configuration to sustain flight while the UAV is airborne.

Figure 2:
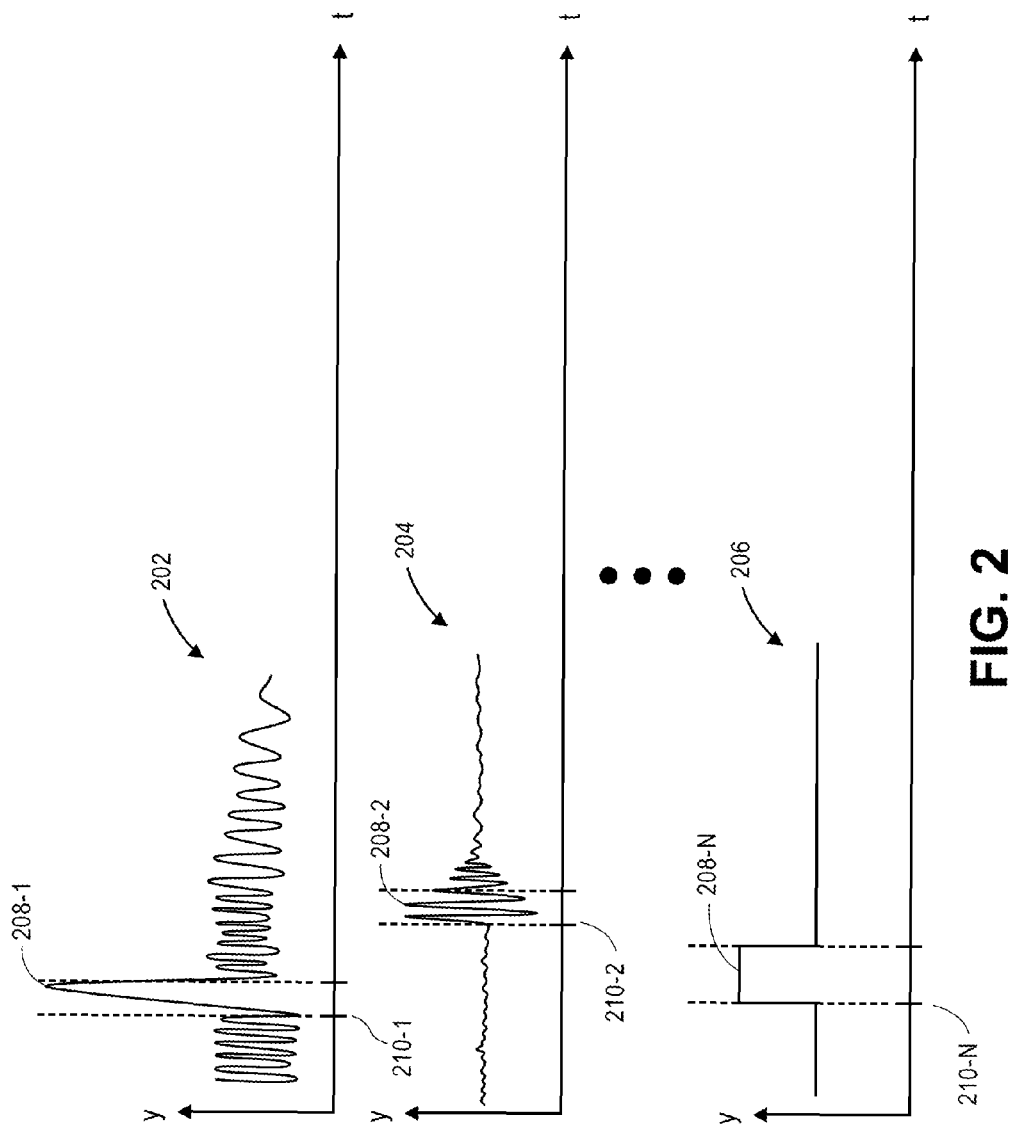
FIG. 2 depicts a diagram of sensor data from multiple sensors of an unmanned aerial vehicle, according to an implementation.

FIG. 2 depicts a diagram of sensor data from multiple sensors of an unmanned aerial vehicle, according to an implementation. In this example, the first depiction of sensor data 202 corresponds to sensor data collected by a microphone. The second depiction of sensor data 204 corresponds to sensor data collected by an accelerometer. The third depiction of sensor data 206 corresponds to data collected by a video camera. The depictions of sensor data illustrate a frequency of the data over a period of time (t). Likewise, the depiction of sensor data 202, 204, 206 is illustrated before the sensors are aligned to illustrate that, even though the identifiable signals generated by an event synchronization component occurred at approximately a same time, the timestamps 210-1, 210-2, 210-N associated with each collected signal may vary.

In the illustrated example, the identifiable signals 208-1, 208-2, 208-N generated by the synchronization event are illustrated as peaks in the amplitude of the sensor data 202, 204, 206. However, because each sensor may utilize a different clock, the timestamps 210-1, 210-2, 210-N indicating a start of each identifiable signal is different.

Figure 3:
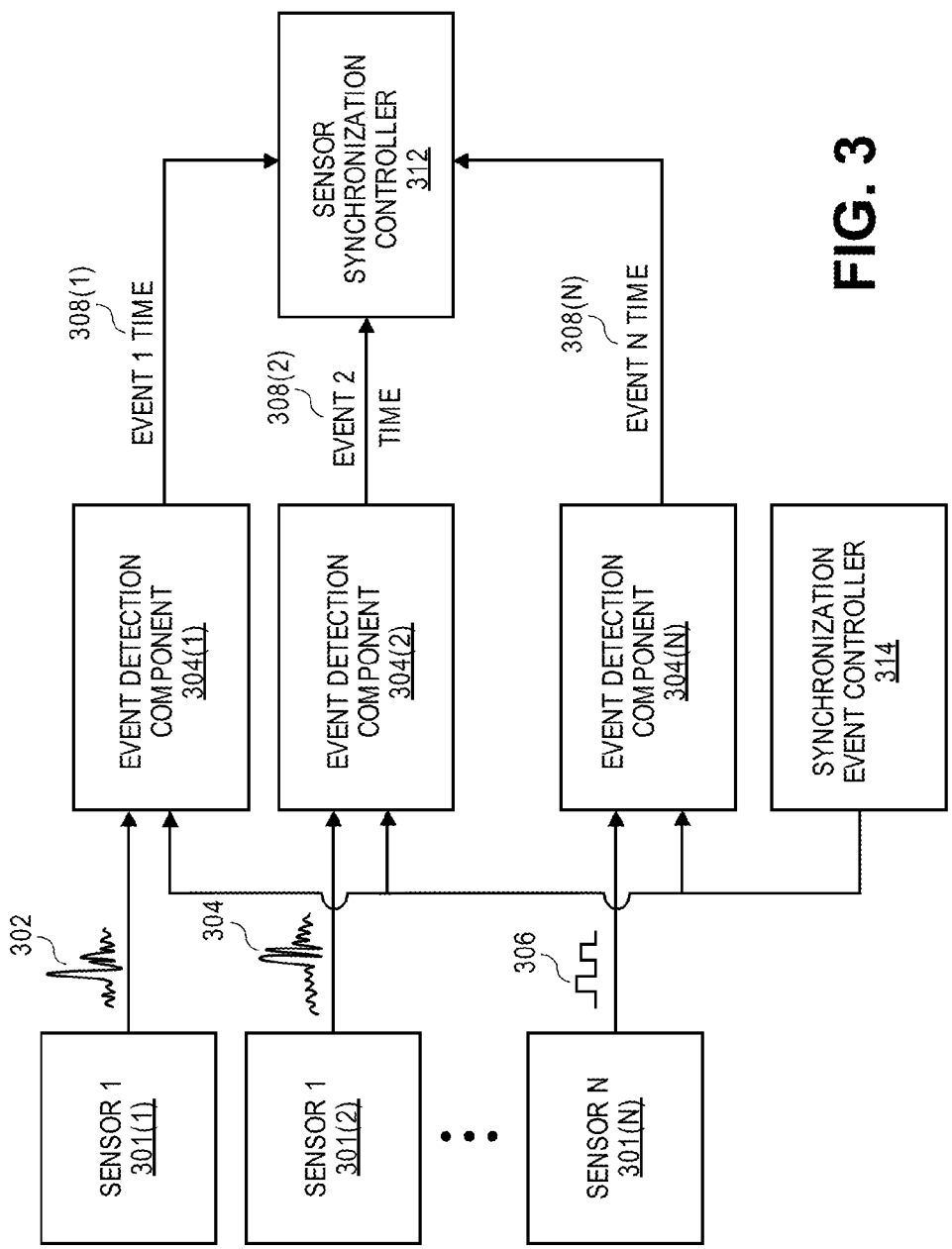
FIG. 3 is a block diagram of sensors, event detection components and a sensor synchronization controller, according to an implementation.

FIG. 3 is a block diagram of sensors 301, event detection components 304, and a sensor synchronization controller 312, according to an implementation. To synchronize the sensor data 302, 304, 306 generated by each sensor 301 in response to an event, the output sensor data is processed by an event detection component 304. Each event detection component 304 is configured to process sensor data of the type generated by the sensor in response to an event. For example, event detection component 304(1) is configured to process audio sensor data 302 generated by a microphone 301(1) (audio sensor). Likewise, event detection component 304(2) is configured to process accelerometer sensor data 304 generated by an accelerometer 301(2). Finally, event detection component 304(N) is configured to process video sensor data 306 generated by a video camera 301(N).

While the example illustrated in FIG. 3 illustrates that each event detection component is coupled to and processes sensor data from a single sensor 301, in other implementations, one or more of the event detection components 304 may be configured to process sensor data generated by multiple sensors of a same or similar type. For example, a UAV may include multiple video cameras that record different types of video (e.g., image video, thermal video, etc.). In some implementations, the event detection component 304 may be configured to detect events in any type of video data.

As discussed, the synchronization event controller 314 generates or causes to be generated a synchronization event that is detectable by the event detection components 304. In some implementations, the synchronization event controller 314 may provide an event time to the event detection components 304 to indicate that the event has been performed. In other implementations, the synchronization event controller 314 may provide an indication or signal to the event detection components to indicate that an event is or is about to be performed.

The event detection components 304, upon receiving an indication or time of an event, process sensor data to monitor for an occurrence of an event that is identifiable from the sensor data 302, 304, 306. Upon detection of an occurrence of an event, each event detection component will provide to the sensor synchronization controller 312 an event time 308(1) representative of a timestamp from the sensor data corresponding to the occurrence of the event, as recorded by the respective sensor 301 and detected by the event detection component. For example, event detection component 304(1) will detect the occurrence of an event as represented by the sensor data 302 and provide an event 1 time 308(1) indicating a timestamp from the sensor data as to when the event occurred. Event detection component 304(2) will detect the occurrence of an event as represented by the sensor data 304 and provide an event 2 time 308(2) indicating a timestamp from the sensor data as to when the event occurred. Event detection component 304(N) will detect the occurrence of an event as represented by the sensor data 306 and provide an event N time 308(N) indicating a timestamp from the sensor data as to when the event occurred. In some implementations, the event time will represent a start time at which the event was detected in the sensor data. In other implementations, the event time may represent a start time and a stop time indicating a start time at which the event was detected and an end time when detection of the event in the sensor data concluded.

The sensor synchronization controller 312, upon receiving the event times from the event detection components 304 determines adjustments that are to be made so that the sensor data is synchronized. For example, the sensor synchronization controller may determine that the clock of one or more of the sensors is to be adjusted based on the different event times that were received. For example, the event synchronization controller 312 may determine a difference or offset between the event 1 time 308(1) determined by the event detection component 304(1) and the event 2 time 308(2) determined by the event detection component 304(2) and adjust the time of the clock utilized by the second sensor 301(1) such that the event times are aligned. Alternatively, the event synchronization controller 312 may determine an offset amount that is used to adjust the timestamp that is associated with the second sensor data 304 by the offset amount so that the timestamps and corresponding data are aligned when stored. The offset may be included and/or stored with the data so that it can be used to adjust the sensor data timestamps when the sensor data is viewed or processed.

While the example illustrated in FIGS. 2-3 show three sets of sensor data from three different sensors of the UAV, any number of sensors and/or types of data may be collected, detected, and synchronized with the implementations discussed herein.

Figure 4:
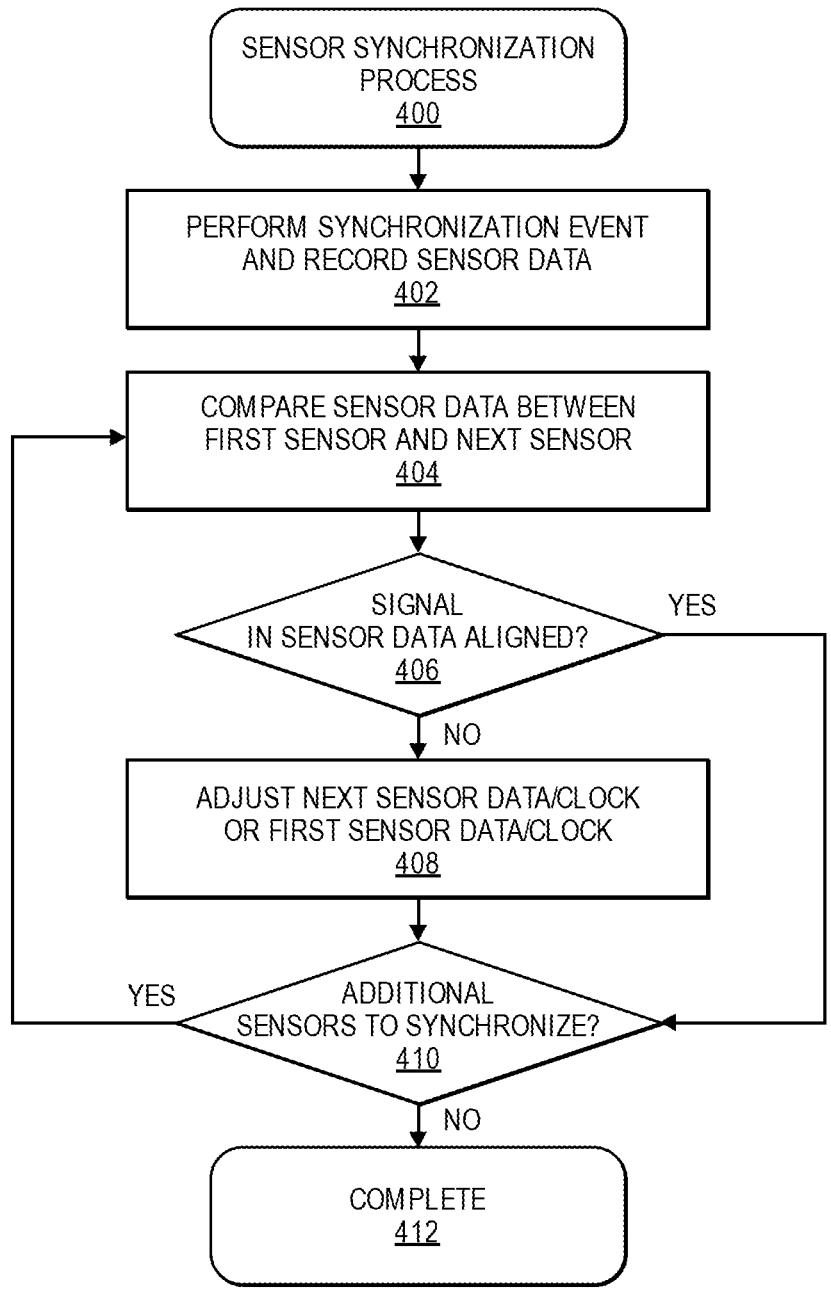
FIG. 4 is a flow diagram illustrating an example sensor synchronization process, according to an implementation.

FIG. 4 is a flow diagram illustrating an example sensor synchronization process 400, according to an implementation. This process, and each process described herein, may be implemented by the architectures described herein or by other architectures. This process is illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

The example process begins by performing or causing to be performed a synchronization event, as in 402. As discussed above, a synchronization event may be performed by a synchronization event component that is capable of generating multiple types of outputs at approximately the same time that can be collected by the various sensors of the UAV. For example, the synchronization event component may cause a physical impact with the UAV to provide a physical output and/or audio output, the synchronization event component may generate an audio output, and/or the synchronization event component may generate a visual output.

In some implementations, the various output signals (physical, audible, visible) may be generated at approximately the same time and the device synchronization controller may be configured to synchronize the sensors based on simultaneous occurrences of the various output signals. In other implementations, the various output signals may be generated at defined intervals. For example, a first output signal may be initially generated followed by a second output signal that is generated after a defined period of time (e.g., two seconds) has elapsed. In such an implementation, rather than synchronizing the sensors so that the signals are aligned temporally, the sensors may be synchronized so that the signals are offset by the defined amount of time (e.g., two seconds).

In another implementation, rather than using an event synchronization component to generate a synchronization event, the UAV may perform an aerial maneuver as the synchronization event that will result in identifiable signals collected by the various sensors. For example, the UAV may temporarily disengage the propeller motors. Such an event will result in the audio output collected by a microphone changing because the noise of the propellers/motors will stop. Likewise, the altitude sensor will detect a change in the altitude resulting from the UAV descending. A visual change will also be detected due to the change in the video of the camera as the UAV descends.

In other implementations, other maneuvers may be performed. For example, the UAV may increase the rotation of the propellers, perform a yaw, pitch, and/or roll, etc. With any particular aerial maneuver, identifiable signals may be output that are collected by the UAV sensors and used to synchronize the sensors.

Returning to FIG. 4, upon collection of sensor data by the various sensors of the UAV, the sensor data is processed to detect the event and determine an event time, according to the sensor and recorded as a timestamp in the sensor data, as in 303. The respective event times are then compared. For example, the event time determined for the first sensor is compared with event time determined for the second or next sensor, as in 404. For example, referring back to FIG. 2, a first event time may be determined from the first sensor data 202, a second event time may be determined from the second sensor data 204 and the event times may be compared to determine if the identifiable signals 208-1, 208-2 are aligned as occurring temporally, or having a same timestamp 210-1, 210-2.

Based on the comparison of the event times, it is determined whether the sensor data of the sensors is aligned, as in 406. If it is determined that the sensor data is not aligned, the sensor data and/or the clocks corresponding to the sensors are adjusted, as in 408. In some implementations, one or both of the first sensor or the second sensor may be adjusted, one or both of the clocks utilized by the first sensor or the second sensor may be adjusted, and/or one or both of the first sensor data and the second sensor data may be adjusted. For example, a difference or offset between the timestamp of the first sensor data and the second sensor data may be determined and a clock of one or more of the sensors may be adjusted by the offset amount. Alternatively, rather than adjusting a clock, as data is collected, the timestamp associated with sensor data from one of the sensors may be adjusted by the offset amount. In still another example, the offset may be stored or otherwise associated with the sensor and/or the sensor data. When a portion of the sensor data is requested or used by other processes, the offset may be utilized to adjust the portion of the sensor data.

Upon synchronization of the first sensor and the second sensor, or if it is determined at decision block 406 that the first sensor and the second sensor are aligned, a determination is made as to whether additional sensors of the UAV are to be synchronized, as in 410. If additional sensors are to be synchronized, the example process 400 returns to block 404 and continues. If no additional sensors remain, the example process 400 completes, as in 412.

Figure 5:
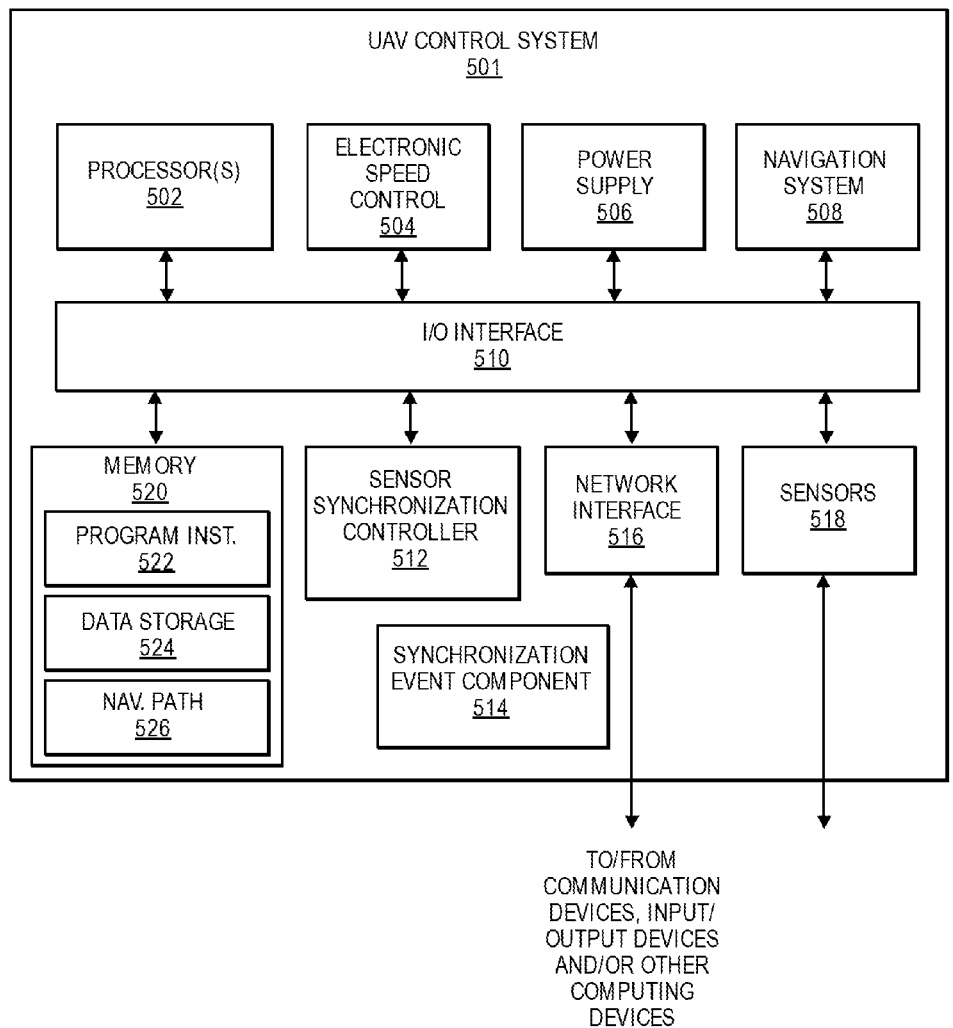
FIG. 5 is a block diagram illustrating various components of an unmanned aerial vehicle control system, according to an implementation.

FIG. 5 is a block diagram illustrating an example UAV control system 501 of the UAV 100 (FIG. 1). In various examples, the block diagram may be illustrative of one or more aspects of the UAV control system 501 that may be used to implement the various systems and methods discussed above. In the illustrated implementation, the UAV control system 501 includes one or more processors 502, coupled to a non-transitory computer readable storage medium 520 via an input/output (I/O) interface 510. The UAV control system 501 may also include a propeller motor controller 504, such as an electronic speed control (ESC), a power module 506, and/or a navigation system 508. The UAV control system 501 further includes a sensor synchronization controller 512, a synchronization event component 514, a network interface 516, and two or more sensors 518.

In various implementations, the UAV control system 501 may be a uniprocessor system including one processor 502, or a multiprocessor system including several processors 502 (e.g., two, four, eight, or another suitable number). The processor(s) 502 may be any suitable processor capable of executing instructions. For example, in various implementations, the processor(s) 502 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 502 may commonly, but not necessarily, implement the same ISA.

The non-transitory computer readable storage medium 520 may be configured to store executable instructions, data, navigation paths, and/or data items, such as sensor data, accessible by the processor(s) 502. In various implementations, the non-transitory computer readable storage medium 520 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 520 as program instructions 522, data storage 524 and navigation path data 526, respectively. In other implementations, program instructions, data, and/or navigation paths may be received, sent, or stored upon different types of computer-accessible media, such as non-transitory media, or on similar media separate from the non-transitory computer readable storage medium 520 or the UAV control system 501. Generally speaking, a non-transitory, computer readable storage medium may include storage media or memory media such as magnetic or optical media, e.g., disk or CD/DVD-ROM, coupled to the UAV control system 501 via the I/O interface 510. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 516.

In one implementation, the I/O interface 510 may be configured to coordinate I/O traffic between the processor(s) 502, the non-transitory computer readable storage medium 520, and any peripheral devices, the network interface 510 or other peripheral interfaces, such as sensors 518. In some implementations, the I/O interface 510 may perform any necessary protocol, timing or other data transformations to convert data signals from one component (e.g., non-transitory computer readable storage medium 520) into a format suitable for use by another component (e.g., processor(s) 502). In some implementations, the I/O interface 510 may include support for devices attached through various types of peripheral buses, such as a variant of the Peripheral Component Interconnect (PCI) bus standard or the Universal Serial Bus (USB) standard, for example. In some implementations, the function of the I/O interface 510 may be split into two or more separate components, such as a north bridge and a south bridge, for example. Additionally, in some implementations, some or all of the functionality of the I/O interface 510, such as an interface to the non-transitory computer readable storage medium 520, may be incorporated directly into the processor(s) 502.

The propeller motor(s) controller 504 communicates with the navigation system 508 and adjusts the power of each propeller motor to guide the UAV along a determined navigation path and/or to cause the UAV to perform a synchronization event, such as a particular aerial maneuver. The navigation system 508 may include a GPS or other similar system that can be used to navigate the UAV to and/or from a delivery location. The sensor synchronization controller 512 communicates with the sensors 518 to receive sensor data and processes that sensor data to determine if the sensors are synchronized. In some implementations, the sensor synchronization controller 512 may include each of the event detection components discussed above. In other implementations, the UAV control system 501 may include the event detection components that receive the sensor data, detect the occurrence of the event and provide the corresponding event times to the sensor synchronization controller 512.

The synchronization event component 514 is configured to cause a synchronization event. For example, the synchronization event component may include output components, such as a solenoid, actuator, speaker, illumination element etc. that are used to generate output signals as part of a synchronization event. Alternatively, or in addition thereto, the synchronization event component 514 may be configured to communicate with the navigation system 508, the event detection components, and/or the motor controller 504 to cause the UAV to perform a synchronization event—such as an aerial maneuver.

The network interface 516 may be configured to allow data to be exchanged among the UAV control system 501, other devices attached to a network, such as other computer systems, and/or with UAV control systems of other UAVs. For example, the network interface 516 may enable wireless communication between numerous UAVs. In various implementations, the network interface 516 may support communication via wireless general data networks, such as a Wi-Fi network. For example, the network interface 516 may support communication via telecommunications networks such as cellular communication networks, satellite networks, and the like.

Sensors 518 may include a camera, a GPS receiver, an accelerometer, an inclinometer, a barometer, a microphone, a gyroscope, a distance determining element (e.g., time of flight sensor), an IMU, a magnetometer, an ESC sensor, a light sensor, and the like. Any number and/or type of sensors 518 may be present on the UAV and synchronized using the implementations described herein. One or more of these sensors may be utilized to assist in the landing as well as avoid obstacles during delivery and/or engagement of inventory. For example, two or more sensors may be considered as part of a flight operability check to assess whether the UAV is operable and safe for flight to a delivery destination.

As shown in FIG. 5, the memory 520 may include program instructions 522 that may be configured to implement the example processes described above. The data storage 524 may include various data stores for maintaining data items that may be provided for determining navigation paths, generating synchronization events, comparing sensor data, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 501 is merely illustrative and is not intended to limit the scope of the present disclosure. The UAV control system 501 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV control system 501 may be transmitted to the UAV control system 501 via transmission media or signals such as electrical, electromagnetic, or digital signals, conveyed via a communication medium such as a wireless network. Various implementations may further include receiving, sending, or storing instructions and/or data implemented in accordance with the foregoing description upon a computer-accessible medium. Accordingly, the techniques described herein may be practiced with other UAV control system configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A method to synchronize a plurality of sensors of an unmanned aerial vehicle ("UAV") in real time, the method comprising:
    performing a synchronization event;
    collecting with a first sensor of the plurality of sensors, a first signal corresponding to the synchronization event;
    detecting, with an event detection component, the synchronization event as recorded in the first signal by the first sensor;
    determining, with the event detection component, a first timestamp corresponding to the detected synchronization event as recorded in the first signal;
    collecting with a second sensor of the plurality of sensors, a second signal corresponding to the synchronization event;
    detecting, with the event detection component, the synchronization event as recorded in the second signal by the second sensor;
    determining, with the event detection component, a second timestamp corresponding to the detected synchronization event as recorded in the second signal; and
    adjusting, in real time, at least one of the first timestamp or the second timestamp such that the first signal and the second signal are temporally aligned.

2. The method of claim 1, wherein the synchronization event generates at least one of an identifiable audio signal, an identifiable visual signal, or an identifiable physical signal.

3. The method of claim 1, wherein:
    the first sensor utilizes a first clock for generating the first timestamp that is associated with the first signal collected by the first sensor;
    the second sensor utilizes a second clock for generating the second timestamp that is associated with the second signal collected by the second sensor; and
    the first clock and the second clock are different clocks.

4. The method of claim 1, wherein the synchronization event is performed by a synchronization event component that generates at least one of an audio output, a visual output, or a physical output.

5. The method of claim 4, wherein the synchronization event component is coupled to the UAV.

6. An unmanned aerial vehicle ("UAV") apparatus, comprising:
    a first sensor configured to collect first sensor data of a first data type;
    a second sensor configured to collect second sensor data of a second data type;
    an event detection component configured to detect an occurrence of a synchronization event recorded in the first sensor data and the second sensor data;
    a synchronization event controller configured to align a first time of the first sensor with a second time of the second sensor;
    a processor; and
    a memory coupled to the processor and storing program instructions that when executed by the processor causes the processor to at least:
        cause the synchronization event to be generated;
        instruct the event detection component to at least:
            detect the occurrence of the synchronization event as recorded in the first sensor data; and
            determine a first event time corresponding to a first timestamp associated with the first sensor data recorded by the first sensor;
            detect the occurrence of the synchronization event as recorded in the second sensor data; and
            determine a second event time corresponding to a second timestamp associated with the second sensor data recorded by the second sensor;
        instruct the synchronization event controller to at least:
            compare the first event time with the second event time; and adjust at least one of the first sensor data or the second sensor data.

7. The UAV apparatus of claim 6, further comprising:
a synchronization event component configured to generate the synchronization event, wherein:
the synchronization event component generates a plurality of outputs at approximately a same time;
at least one output of the plurality of outputs is collected by the first sensor; and
at least one output of the plurality of outputs is collected by the second sensor.

8. The UAV apparatus of claim 7, wherein the plurality of outputs include at least one of an audio output, a visual output, or a physical output.

9. The UAV apparatus of claim 8, wherein the synchronization event component, in generating the synchronization event, causes a physical contact with the UAV that generates at least one of the physical output or the audio output.

10. The UAV apparatus of claim 9, wherein the synchronization event component, in generating the synchronization event, generates the visual output.

11. The UAV apparatus of claim 7, wherein the synchronization event is performed by the UAV executing a maneuver while in-flight that produces a plurality of identifiable signals.

12. The UAV apparatus of claim 6, wherein the first sensor is at least one of a camera, a GPS receiver, an accelerometer, an inclinometer, a barometer, a microphone, a gyroscope, an inertial measurement unit, a magnetometer, a distance determining element, or an electronic speed control.

13. The UAV apparatus of claim 6, wherein the first sensor is adjusted by adjusting a first clock associated with the first sensor, or the second sensor is adjusted by adjusting a second clock associated with the second sensor.

14. The UAV apparatus of claim 6, wherein the program instructions that when executed by the processor further cause the processor to at least:
utilize, while the UAV is in flight, the first sensor data and the second sensor data after at least one of the first sensor data or the second sensor data has been adjusted to determine an operability of the UAV.

15. A method, comprising:
performing a synchronization event with respect to an unmanned aerial vehicle ("UAV");
collecting with a first sensor a first signal corresponding to the synchronization event;
collecting with a second sensor a second signal corresponding to the synchronization event;
determining with an event detection component a first time of the synchronization event as recorded by the first sensor and a second time of the synchronization event as recorded by the second sensor; and
synchronizing the first sensor and the second sensor based at least in part on the first time and the second time.

16. The method of claim 15, further comprising:
subsequent to synchronizing, initiating a flight of the UAV.

17. The method of claim 15, further comprising:
storing sensor data collected by the synchronized first sensor and second sensor.

18. The method of claim 15, wherein synchronizing is performed by an event synchronization controller of the UAV during a flight of the UAV.

19. The method of claim 15, wherein the synchronization event includes at least two of a visual signal detectable by at least one of the first sensor or the second sensor, an audio signal detectable by at least one of the first sensor or the second sensor, or a physical signal detectable by at least one of the first sensor or the second sensor.

20. The method of claim 15, wherein the synchronization event includes an aerial maneuver performed by the UAV while the UAV is in flight.

* * * * *